United States Patent [19]

Ochiai

[11] 4,142,601
[45] Mar. 6, 1979

[54] MOTION PREVENTING DEVICE FOR MOTOR VEHICLES

[75] Inventor: Takeshi Ochiai, Toyota, Japan

[73] Assignee: Toyota Jidosha Kogyo Kabushiki Kaisha, Aichi, Japan

[21] Appl. No.: 757,835

[22] Filed: Jan. 10, 1977

[30] Foreign Application Priority Data

Jun. 23, 1976 [JP] Japan .................. 51-74214

[51] Int. Cl.² ............................................. B60R 25/04
[52] U.S. Cl. ................................. 180/99; 180/82 A; 307/10 R
[58] Field of Search .................. 307/10 R, 10 AT; 340/52 R, 52 E, 53, 279; 180/82 A, 99, 114, 82 C

[56] References Cited

U.S. PATENT DOCUMENTS

| 3,718,202 | 2/1973 | Brock | 180/82 A X |
| 3,788,422 | 1/1974 | Bowler | 180/114 |
| 3,859,625 | 1/1975 | Eggert | 180/82 A X |
| 3,870,120 | 3/1975 | Blinkilde | 180/82 C |
| 3,942,151 | 3/1976 | Takeuchi | 340/279 X |
| 4,039,852 | 8/1977 | Miyamoto | 307/10 R X |

Primary Examiner—Joseph F. Peters, Jr.
Assistant Examiner—Terrance L. Siemens
Attorney, Agent, or Firm—Koda and Androlia

[57] ABSTRACT

A device for preventing the motion of a motor vehicle unless some predetermined condition is satisfied, such as the suitability to drive of the operator. The device includes a driving suitability discriminating means for discriminating the suitability of the operator to drive the motor vehicle, a neutral switch for detecting if the transmission is in a neutral position and a motion preventing means responsive to both the suitability discriminating means and the neutral switch such that the engine of the motor vehicle can be started if the transmission is in neutral but the motor vehicle cannot be driven unless the operator is discriminated to be suitable by the suitability discriminating means.

7 Claims, 3 Drawing Figures

MOTION PREVENTING DEVICE FOR MOTOR VEHICLES

BACKGROUND OF THE INVENTION

1. Field of Invention

This invention relates to safety devices for motor vehicles and more particularly to safety devices for preventing the operation of the vehicle if the driver is in an unfit condition to drive.

2. Prior Art

There already exists in the prior art devices which discriminate the fitness of the driver's condition for driving and make it impossible to operate the motor vehicle if the driver is unfit. These devices are constructed to give the operator certain test exerciese and allow the operator to start the engine of the motor vehicle only if the driver makes appropriate responses to the exercises. Examples of this type of motion preventing device are those which prevent drunken driving or driving when too fatigued.

There also exists in the prior art other devices which necessitate having the seat belt fastened. These types of devices allow the operator to start the engine of the motor vehicle only when the driver has correctly responded to test exercises or when the seat belt is fastened. It is generally accepted that such devices are very effective in preventing accidents. Generally, these existing motion preventing devices operate by having a locking device on the ignition system such that the lock is released if the operator of the motor vehicle is in a suitable condition. The problem with these devices is that until the condition of the driver is ascertained, the engine of the motor vehicle cannot be started. This becomes a significant shortcoming especially in cold weather when driving with a warmed-up engine is necessary. In other words, the problem of lost operability of the car has arisen because the engine cannot be started until the driver's condition has been found acceptable or the seat belt has been fastened. Or in other words, while the testing of the driver's condition is being carried out the engine cannot be started which in turn lengthens the time until the engine is warmed up and can be driven, all to the annoyance of the operator of the motor vehicle. Another difficulty is with systems where the belt must be fastened or the engine cannot be started, the driver of the motor vehicle cannot leave his seat during warmup.

Accordingly, it is an object of the present invention to provide a motion preventing device which overcomes the shortcomings of the prior art.

SUMMARY OF THE INVENTION

It is a general object of the present invention to provide a device for preventing the motion of a motor vehicle unless the operator of the motor vehicle is fit to drive.

It is still another object of the present invention to provide a device for preventing the motion of a motor vehicle which allows the driver to start the vehicle if some predetermined condition is met but does not allow the vehicle to be driven unless the driver is fit to drive.

It is yet another object of the present invention to provide a device for preventing the motion of a motor vehicle which is easy to manufacture and low in cost.

In keeping with the principles of the present invention, the objects are accomplished by a unique device for preventing the motion of a motor vehicle. The device includes a driving suitability discriminating means for discriminating if the operator is fit to drive, a neutral switch for detecting if the transmission is in a neutral position and a motion preventing means responsive to both the suitability discriminating means and the neutral switch such that the engine of the motor vehicle can be started if the transmission is in neutral but the motor vehicle cannot be driven unless the operator is discriminated to be fit by the suitability discriminating means.

BRIEF DESCRIPTION OF THE DRAWINGS

The above mentioned and other features and objects of the present invention will become more apparent by reference to the following description taken in conjunction with the accompanying drawings, wherein like reference numerals denote like elements, and in which.

DETAILED DESCRIPTION OF THE INVENTION

Figure 1:
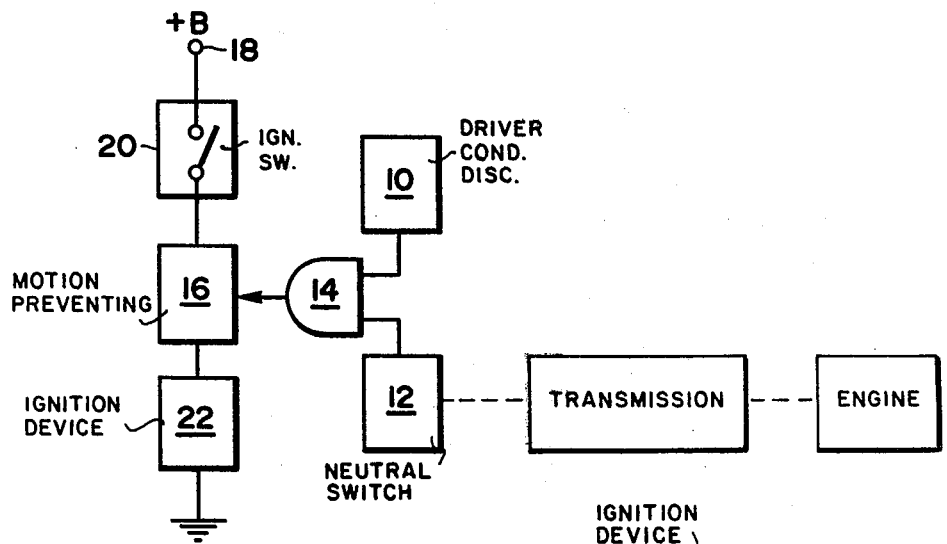
FIG. 1 is a block diagram of a motion preventing device in accordance with the teachings of the present invention.

Referring more particularly to the drawings, shown in FIG. 1 is a block diagram of a motion preventing device in accordance with the teachings of the present invention. The motion preventing device includes a circuit 10 which discriminates the condition of the driver. Such a device can comprise a means for detecting the drunkenness of the operator and which generates information that his condition is suitable for driving when the driver has correctly responded to certain problems. Such devices are well known in the art. The output of circuit 10 is connected to one input of an AND gate 14. A neutral switch 12 which detects if the motor vehicle's transmission is in a neutral position is coupled to the other input of AND gate 14. The output of AND gate 14 is coupled to a motion preventing device 16. The motion preventing device 16 can be constructed in a variety of forms and in the example shown in FIG. 1 is composed of a switch inserted in the automobile's ignition system. In particular, the motion preventing device is inserted between the ignition switch 20 and an ignition device 22. The other side of ignition switch 20 is connected to the positive terminal 18 of the motor vehicle's battery.

In operation, before the engine of the motor vehicle is started the driving suitability discriminating circuit 10 supplies a stop signal to the AND gate 14. Furthermore, when the transmission is placed in the neutral position at the time the engine is started, the neutral switch 12 delivers a release signal to the AND gate 14. The AND gate 14 sets the motion preventing device 16 in a stop condition only if stop signals have been applied to both its inputs. Accordingly, in the example shown in FIG. 1, before the engine is started the output of the AND gate 14 turns to a release condition if the transmission is in the neutral position and accordingly the motion preventing device 16 switches to the ON condition. Thus, ignition current is supplied to the ignition device through the ignition switch 20 and the motion preventing device 16 making it possible to start the engine. That is to say, when the transmission is in the neutral position, the neutral switch supplies the release signal and it will always be possible to start the engine of the motor vehicle.

If under these conditions the driver tries to drive the motor vehicle without taking the driving suitability test, the neutral switch 12 will send a stop signal to the AND gate 14 as a result of changing the gear of the transmission. As a result, AND gate 14 will deliver a stop signal to the motion preventing device 16 and current to the ignition device 22 will be cut off. Accordingly, the engine will stop, making driving impossible.

To avoid such a stoppage the driver must subject himself to the driving suitability test. If his condition is suitable, the suitability discriminating circuit 10 sends a release signal to the AND gate 14. If the driver has been discriminated to be suitable, the AND gate 14 will not cause the motion preventing device 16 to stop the operation of the motor vehicle even if the transmission is changed to another gear other than neutral. Accordingly, the motor vehicle is left in a freely drivable state.

On the other hand, if the driver is too inebriated or fatigued to pass the suitability test, the driving suitability discriminating circuit 10 delivers a stop signal to the AND gate 14 thereby rendering the motor vehicle immovable.

As is clear from the foregoing description, by means of a device for preventing the motion of a motor vehicle in accordance with the teachings of the present invention, the starting of the engine is always possible as long as the transmission is in neutral but the actual driving of the motor vehicle will only be possible if the driver is in a suitable driving condition.

Figure 2:
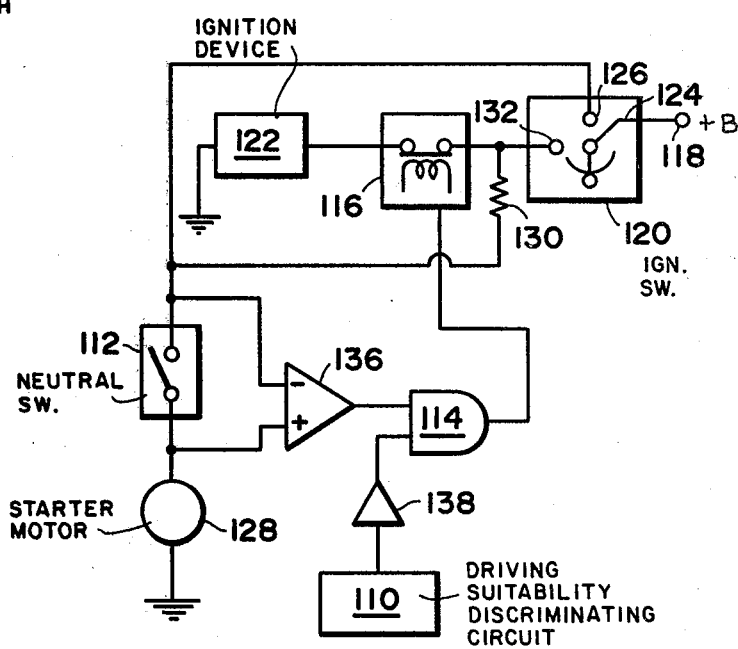
FIG. 2 is a circuit diagram of a motion preventing device in accordance with the teachings of the present invention.

Referring to FIG. 2, shown therein is a circuit diagram for a motion preventing device in accordance with the teachings of the present invention. The positive terminal 118 of a motor vehicle battery, not shown, is connected to a movable contact point 124 of ignition switch 120. The starter terminal 126 of ignition switch 120 is coupled to the starter motor 128 through neutral switch 112. The starter terminal 126 is further connected to ignition terminal 132 through resistor 130. The ignition terminal 132 is connected to the ignition device 122 through a motion preventing device 116 which is made up of a motion stopping relay having a normally closed contact operated to turn OFF when an associates relay coil is energized. The two sides of neutral switch 112 are coupled to the two inputs of differential amplifier 136 and the output of differential amplifier 136 is electrically coupled to one terminal of an AND gate 114. The other input terminal of AND gate 114 is connected to a driving suitability discriminating circuit 110 through an inverter 138. The output terminal of AND gate 114 is electrically coupled to the input terminal of the motion preventing device 116.

In operation, when the transmission is in the neutral position, the neutral switch 112 is in the ON state. Accordingly, both input sides of the amplifier 136 have the same potential and the level of the output becomes low. In other words, the release signal is delivered to the AND gate 114. Meanwhile, the output of the driving suitability discriminating circuit 110 takes on a low level before testing and a high level stop signal is delivered to the AND gate 114 by the inverting action of the inverter 138. As a result, the output of AND gate 114 becomes a release signal and the motion preventing device 116 is in the ON state.

When the motion preventing device 116 is in the ON state with the transmission in the neutral position, contact point 124 of ignition switch 120 is connected to the starter terminal 126. Accordingly, the starter 128 turns over through neutral switch 112. Since at this time the contact point 124 is also electrically coupled to the ignition terminal 132, the battery is also electrically coupled to the ignition device 122 through the contacts of motion preventing device 116 and the engine will start. After the engine starts, contact point 124 is switched to the ignition terminal 132 and the engine continues to run.

Under these conditions, if the transmission is changed to a position other than the neutral position, the neutral switch 112 turns off. As a result, one terminal of the differential amplifier 136 takes on the positive voltage of the battery through resistance 130 and the other terminal takes on the ground voltage through starter motor 128. Accordingly, the output of amplifier 136 takes on a high level or, in other words, a stop signal. Therefore, when the stop signal is delivered from the driving suitability discriminating circuit 110 to the AND gate 114, the AND gate 114 delivers a stop signal to the motion preventing device 116 and the motion preventing device 116 assumes an OFF state. Accordingly, the supply of electrical current to the ignition device 122 is cut off and the operation of the vehicle becomes impossible.

If, on the other hand, the driver takes the driving suitability test before changing the transmission and is found to be in a suitable condition, the output of discriminating circuit 110 takes on a high level and a low level release signal is delivered at the AND gate 114 through inverter 138. Accordingly, even though the transmission gear is changed and the output of the differential amplifier 136 becomes a stop signal, a stop signal will not be sent from the AND gate 114 to the motion preventing device 116 and continued operation of the vehicle is possible.

As shown in the illustrated examples above, starting of the engine is possible without the driving suitability test having been taken which eliminates the additional difficulties encountered in starting operations when warming up the engine in cold weather or when regulating the engine.

Figure 3:
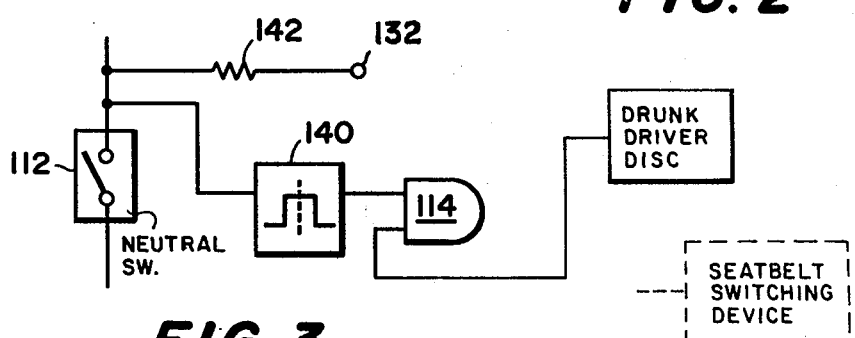
FIG. 3 is a block diagram of a neutral switch signal detecting circuit.

Referring to FIG. 3, shown therein is a second neutral switch position detecting circuit. The circuit shown in FIG. 3 is substituted for the same portion as shown in FIG. 2. In FIG. 3, ignition terminal 132 of ignition switch 120 in FIG. 2 is applied to one terminal of resistors 142 and the other terminal of resistor 142 is connected to one side of neutral switch 112 and to the input of a comparator 140. The output of the comparator 140 is coupled to one input of the AND gate 114. In operation, the comparator 140 detects the given voltage applied by the resistor 142 when the neutral switch 112 is in the OFF condition. Accordingly, when the neutral switch 112 is in the ON condition a low signal is supplied to AND gate 114. In the case shown in FIG. 3 it is possible to detect the condition of the neutral switch 112 using only one terminal of the neutral switch 112.

In the examples shown above, the motion preventing device has been a switch inserted in the ignition system, but other means are capable of performing this same function. Such devices include a device to lock the vehicle brakes in a braking condition or a device to set off an alarm and thus stop the operation of the vehicle. The driving suitability discriminating circuit 10 or 110 can also be composed of a switching device which will detect whether a seat belt is fastened. In particular, seat-belt switching device shown in dash lines in FIG. 3 can be substituted for the drunken driver discriminating circuit in FIG. 3. The neutral switch could be a switch coupled to the transmission switch lever, a switching device which would detect the neutral position of the shift lever on a vehicle with a torque converter, or any other suitable means.

As explained above, a motion preventing device in accordance with the teachings of the present invention reliably prevents operation of a vehicle by a driver in unsuitable condition to drive while allowing voluntary starting of the engine only. Accordingly, the operability of a motor vehicle's engine is thereby enhanced.

In all cases it is understood that the above described embodiments are purely illustrative of but a few of the many possible specific embodiments which represent applications of the principles of the present invention. Numerous and other various arrangements can be readily devised by those skilled in the art without departing from the spirit and scope of the invention.

I claim:

1. A device for preventing the motion of a motor vehicle comprising:
    an ignition switch including an ignition terminal, a starter terminal and a movable contact point connected to a power source;
    an ignition device connected to said ignition terminal;
    a starter motor connected to said starter terminal;
    a driver suitability discriminating means for discriminating the suitability of an operator to drive the motor vehicle and generating a first signal corresponding to the suitability;
    a neutral switch means for generating a second signal corresponding to what gear position a transmission of said motor vehicle is changed to; said neutral switch means comprising a neutral switch connected with said starter motor for being controlled to turn on only when said transmission is in a neutral gear position, a differential amplifier having two input terminals coupled to the two sides of the neutral switch and an output terminal, and a resistor connected between the power source side terminal of said neutral switch and said ignition terminal; and
    a motion preventing device coupled to said output terminal of said differential amplifier and actuated by both said driver suitability discriminating means and said neutral switch means, said device serving to disconnect said ignition device from said ignition terminal when said device is supplied said first signal showing an unsuitable condition and a second signal showing that said transmission is changed to a gear position other than a neutral gear position, and when otherwise, connecting said ignition device to said ignition terminal.

2. A device for preventing the motion of a motor vehicle according to claim 1 wherein said motion preventing device comprises a relay in said ignition system.

3. A device for preventing the motion of a motor vehicle according to claim 2 wherein said relay includes a normally closed contact.

4. A device for preventing the motion of a motor vehicle according to claim 2 wherein said motion preventing devices comprises an AND gate having said first and second signals coupled to the inputs of said AND gate and said relay coupled to the output of said AND gate.

5. A device for preventing the motion of a motor vehicle comprising:
    an ignition switch including an ignition terminal, a starter terminal and a movable contact point connected to a power source;
    an ignition device connected to said ignition terminal;
    a starter motor connected to said starter terminal;
    a driver suitability discriminating means for discriminating the suitability of the operator to drive the motor vehicle and for generating a first signal corresponding to the suitability;
    a neutral switch means for generating a second signal corresponding to what gear position a transmission of said motor vehicle is changed to, said neutral switch means comprising a neutral switch connected with said starter motor for being controlled to turn on only when said transmission is in a neutral gear position, a comparator having an input terminal coupled to the power source side terminal of said neutral switch and an output terminal and a resistor connected between said power source side terminal and said ignition terminal; and
    a motion preventing device coupled to an output terminal of said comparator and actuated by both said driver suitability discriminating means and said neutral switch means, said device serving to connect said ignition device from said ignition terminal when said device is supplied said first signal showing an unsuitable condition and said second signal showing that said transmission is changed to a gear position other than a neutral gear position, and when otherwise, connecting said ignition device to said ignition terminal.

6. A device for preventing the motion of a motor vehicle according to claim 5 wherein said driver suitability discriminating means comprises a means for discriminating a drunken driver.

7. A device for preventing the motion of a motor vehicle according to claim 5 wherein said driver suitability discriminating means comprises a detecting device for detecting whether a seat belt is fastened.

* * * * *